United States Patent Office 3,798,271
Patented Mar. 19, 1974

3,798,271
PROCESS FOR THE MANUFACTURE OF 1-AMINO-2,5-DIALKOXY-4-CHLOROBENZENES
Gerhard Podschus, Glashutten, Taunus, Germany, assignor to Farbwerke Hoechst Aktiengesellschaft vormals Meister Lucius & Bruning, Frankfurt am Main, Germany
No Drawing. Filed July 31, 1970, Ser. No. 60,089
Claims priority, application Germany, Aug. 14, 1969, P 19 41 377.5; July 11, 1970, P 20 34 590.8
Int. Cl. C07c 91/44
U.S. Cl. 260—575           9 Claims

ABSTRACT OF THE DISCLOSURE

1 - amino-2,5-di-lower alkoxy-4-chlorobenzenes are obtained in excellent space-time-yields and in high purity when in the reduction process with iron and lower alkane carboxylic acids the 1-nitro-2,5-di-lower alkoxy-4-chlorobenzene is introduced as solution in an organic solvent. The products are valuable diazo compounds for the manufacture of azo dyestuffs.

---

The object of the present invention is an improved process for the manufacture of 1-amino-2,5-dialkoxy-4-chlorobenzenes.

It is known to prepare 1-amino-2,5-dimethoxy-4-chlorobenzene by reduction of 1-nitro-2,5-dimethoxy-4-chlorobenzene with iron according to Béchamps. In said reduction process the iron borings are etched by means of a catalytic amount of formic or acetic acid. In order to maintain in solution the 1-amino-2,5-dimethoxy-4-chlorobenzene resultant from the reduction, an organic solvent is added to the reduction solution. The prior-art process is conducted in a manner such that the nitro compound is introduced into the reduction vessel in solid state using a transportation screw. A disadvantage of the conventional method resides in the great deal of operating expenditure needed. The main drawback, however, is the very long periods required for the reaction which, in general, amount to no less than 10 hours, whereby low space-time yields result. On the other hand, attempts to improve the space-time yield by operating at high concentrations and temperatures lead to resinification and thus to products of lesser purity and lower yields.

Now, it has been found that 1-amino-2,5-dialkoxy-4-chlorobenzenes can be prepared, industrially, in a very advantageous manner by reduction of 1-nitro-2,5-dialkoxy-4-chlorobenzenes by means of iron and formic or acetic acid, at elevated temperatures, in the presence of an organic solvent and water, when said nitro compound is introduced, in solution in an organic solvent, into an initial mixture of finely divided iron, formic or acetic acid, an organic liquid and water, the reduction is completed in known manner and the 1-amino-2,5-dialkoxy-4-chlorobenzenes is isolated from the reaction mixture.

Hence the object of the present invention is a process for the preparation of a compound of the general formula

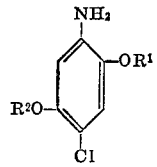

wherein $R^1$ and $R^2$ which may be identical or different, stand for alkyl groups preferably lower alkyl groups. As lower alkyl groups there are preferred those containing up to 5 carbon atoms.

The process of the present invention is, suitably, performed in such a manner that the nitro compound is dissolved at an elevated temperature in a dissolving vessel in an organic liquid, for example, xylene, benzene, toluene or isopropanol and that the so-obtained solution is pumped into the reduction tank. As organic solvent, for the purpose, preferably technical mixtures of xylene are employed containing, for example, about 80% of m-xylene and 20% of ethylbenzene. Advantageously, it is ensured that between the dissolving vessel and the inlet point in the reduction tank no fall in temperature or, practically none, occurs which is achieved by suitable insulation and/or heating of the supply aggregates, for example conduits, pumps, valves, etc. Thus it is possible to use a concentration of dissolved nitro compound which is practically saturated or nearly saturated which helps to ensure a further increase in the space-time yield. The ratio by weight of nitro compound to solvent is, for example, in case of xylenes, in the range of from about 1:2.5 to 1:10, preferably 1:2.5.

Also with use of other solvents as far as possible concentrated solutions are used. This fact however, does not prevent a greater dilution. The temperature of the nitro compound solution, generally, will correspond to the temperature of reduction. Whenever, xylenes or technical mixtures thereof are used, it will be, advantageously, in the range between about 80 and 110° C., preferably about 90° C. and 95° C.

The solution of the nitro compound is added to the initial reduction mixture at such a rate as reaction takes place. In doing so, the reduction velocity is, limited, practically by the possibility of removing the reaction heat only. After adding the dissolved nitro compound, the reaction is allowed to continue for some time in order to complete reduction.

The reduction, is, advantageously, performed between about 60° and 130° C., preferably about 90° and 100° C. The ratio of iron to nitro compound varies, generally, between about 2 to 6, preferably about 3 to 4 mols of iron per each mol of nitro compound. The molar ratio of formic or acetic acid to iron is usually in the range of from about 1:100 to 1:1, preferably about 1:10 to 1:30.

As organic solvent in the initial reduction mixture there is used, preferably, the same liquid as has been employed for the dissolution of the nitro compound.

Work up of the reaction mixture is effected in known manner by separating the iron sludge and isolating the product from the so-obtained solution which, for example is achieved by distilling off the organic solvent with steam.

The technical progress obtained by the present invention resides, primarily, in the fact that an essentially shorter period is needed for the reaction than with the conventional method. While the known process requires for the reduction of a given amount of nitro compound, in total about 12 hours, in the instantly-claimed process the reaction takes place in about 5 hours only. Moreover, according to the invention, in a given reduction vessel 20% more of nitro compound can be reduced. Thus, in total, approximately a 2.5- to 3-fold increase in space-time yield is enabled.

Furthermore, the improved process provides a product of higher purity than obtained by the conventional method as is obvious from the higher solidification point and diazo value. It also permits a certain increase in yield and, finally, necessitates far less operating expenditure than the known method.

EXAMPLE 1

1-amino-2,5-dimethoxy-4-chlorobenzene

Into a stirring apparatus lined with masonry and having a capacity of 10 m.³ there were charged 100 l. of water,
900 kg. (17.9 kmols) of cast iron borings
435 kg. of a technical xylene mixture
10 l. of acetic acid of 66% strength and the whole was heated, while stirred, to the boil.

Subsequently, a 90° C. hot solution of 1050 kg. (4.83 kmols) of 1-nitro-2,5-dimethoxy-4-chlorobenzene (containing 10–12% of water) in 2600 kg. of a technical xylene mixture was pumped into the apparatus from a dissolving vessel within about four and a half hours. After 45 minutes, the reduction was complete. The xylene solution was then separated and the xylene distilled with steam. After cooling, the residue was passed over a suction filter. After drying, 890 kg. (4.75 kmols) of 1-amino-2,5-dimethoxy-4-chlorobenzene were obtained as grain, light-grey to light-brown crystals. The yield amounted to 98.3% of the theory. The product showed a solidification point of 117.5° C. and a diazo value of 97.0–97.5%.

When in the above example in place of acetic acid an equivalent amount of formic acid was used, practically the same result was obtained.

COMPARISON EXAMPLE

The stirring apparatus described in Example 1 was charged with 200 l. of water,
760 kg. (13.6 kmols) of cast iron borings,
2600 kg. of a technical xylene mixture and
10 l. of acetic acid of 66% strength and the whole was heated, while stirred, to the boil.

Subsequently, 850 kg. (3.91 kmols) of solid 1-nitro-2,5-dimethoxy-4-chlorobenzene containing 10–12% of water were introduced over the course of about 9 hours at 90°–95° C., by means of a transportation screw. After maintaining the batch at the said temperature for 3 hours, the reduction was complete.

Work up was effected as specified in the preceding example. Thus, 708 kg. (3.78 kmols) of 1-amino-2,5-dimethoxy-4-chlorobenzene were obtained as a black to dark-brown, grainy and crystalline mass. The yield amounted to 96.6% of the theory. The product showed a solidification point of 116.5° C. and a diazo value of 96–96.5° C.

When in the above example in place of acetic acid an equivalent amount of formic acid was used, practically the same result was obtained.

EXAMPLE 2

1-amino-2,5-diethoxy-4-chlorobenzene

A stirring apparatus lined with masonry and having a capacity of 10 m.³ was charged with 100 l. of water,
900 kg. (17.9 kmols) of cast iron borings,
435 kg. of a technical xylene mixture and 10 l. of acetic acid of 66% strength and the whole was heated to the boil while stirring.

Subsequently, from a dissolving vessel, a 90° C. hot solution of 1200 kg. (4.89 kmols) of 1-nitro-2,5-diethoxy-4-chlorobenzene (containing 10–12% of water in 2600 kg. of a technical xylene mixture was pumped into the stirring apparatus. In doing so, the reaction mixture was kept boiling. 45 minutes after addition of the solution, the reduction was complete.

The xylene solution was, then, separated and the xylene distilled off with steam. After cooling the solution was passed over a suction-filter.

After drying, 1010 kg. (4.68 kmols) of 1-amino-2,5-diethoxy - 4 - chlorobenzene were obtained as violet crystals. The yield amounted to 95.7% of the theory. The product showed a solidification point of 96.0° C. and a diazo value of 97.0–98.0%.

EXAMPLE 3

1-amino-2,5-dibutoxy-4-chlorobenzene

A stirring apparatus lined with masonry and having a capacity of 10 m.³ was charged with 100 l. of water,
900 kg. (17.0 kmols) of cast iron borings
435 kg. of a technical mixture of xylene and
10 kg. of acetic acid of 66% strength and the whole was heated to the boil while stirring.

Subsequently, from a dissolving vessel a 90° C. hot solution of 1460 kg. (4.85 kmols) of 1-nitro-2,5-dibutoxy-4-chlorobenzene in 2600 kg. of a technical xylene mixture was pumped into the stirring apparatus within about 4 and a half hours. In doing so, the reaction mixture was maintained at the boil. 45 minutes after addition of the solution, the reduction was complete. Thereupon, the xylene solution was separated and the xylene distilled off with steam. After cooling, the solution was passed over a suction filter. After drying, 1245 kg. (4.61 kmols) of 1 - amino - 2,5 - dibutoxy - 4 - chlorobenzene were obtained in the form of brown crystals containing 12–15% of water. The yield amounted to 95.0% of the theory. The product showed a solidification point of 36.5° C. and a diazo value of 94–95%.

We claim:

1. In a process for the manufacture of a compound of the formula

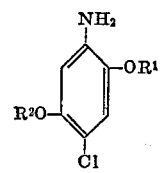

in which R¹ and R² are lower alkyl, by reduction of the corresponding 1 - nitro-2,5-di-lower alkoxy-4-chlorobenzene with iron and lower alkane carboxylic acids in an aqueous organic system at elevated temperatures in which process the said nitro compound is added to a reduction mixture of finely divided iron, formic or acetic acid, an organic liquid and water, agitating the reaction mixture at a temperature of about 60° to 130° C. and isolating the obtained amino compound, the improvement consisting essentially of introducing the said nitro compound dissolved in an organic solvent selected from the group benzene, lower alkyl benzene and lower alkanol, in the form of a solution to the said reduction mixture.

2. The process as claimed in claim 1, wherein the temperature is about 90 to 100° C.

3. The process as claimed in claim 1, wherein the solvent for the nitro compound and said organic liquid are identical.

4. The process as claimed in claim 1, wherein said solvent and said organic liquid are xylene, a technical xylene mixture, benzene, toluene or isopropanol.

5. The process as claimed in claim 1, wherein said solvent and said organic liquid are a technical xylene mixture consisting of about 80% m-xylene and about 20% of ethylbenzene.

6. The process as claimed in claim 1, wherein said nitro compound is dissolved in said solvent as an essentially saturated solution.

7. The process as claimed in claim 1, wherein the solution of the nitro compound is added in essentially the same ratio as it is reduced.

8. The process as claimed in claim 1, wherein per each mol of nitro compound about 2 to 6 mols of iron are used.

9. The process as claimed in claim 1, wherein per each mol of iron about 1 to 100 mols of lower alkane carboxylic acid are used.

References Cited

Groggins, Unit Processes in Organic Synthesis, McGraw-Hill Book Co., Inc.: New York, 1958, pp. 140–145.

Surrey, Name Reactions in Organic Chemistry, Academic Press, Inc.: New York, 1954, pp. 7 and 8.

LEWIS GOTTS, Primary Examiner

C. F. WARREN, Assistant Examiner